W. G. WILSON.
HOSE COUPLING.
APPLICATION FILED SEPT. 11, 1917.
1,264,736.
Patented Apr. 30, 1918.
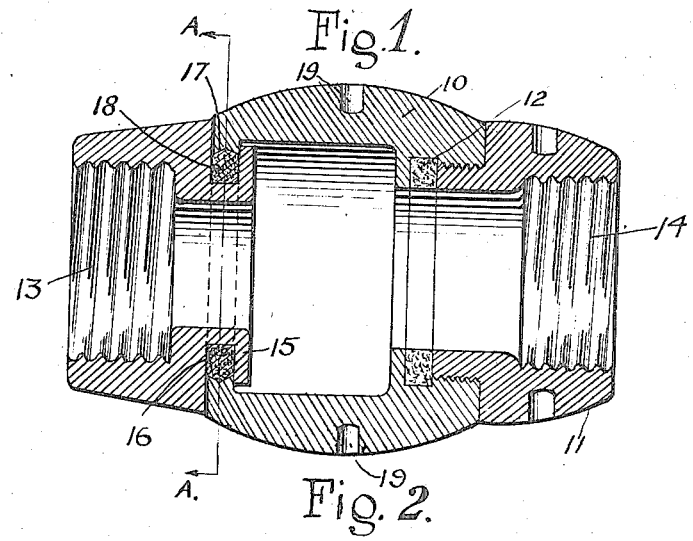
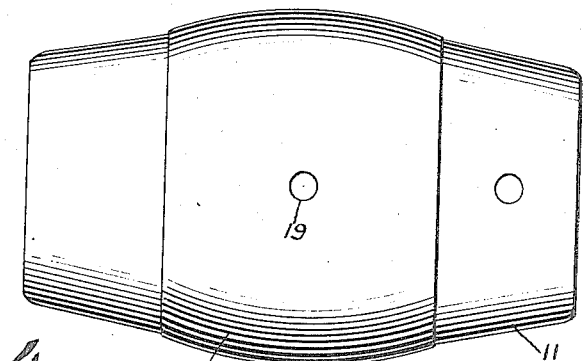
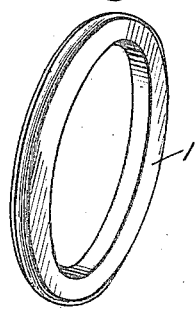
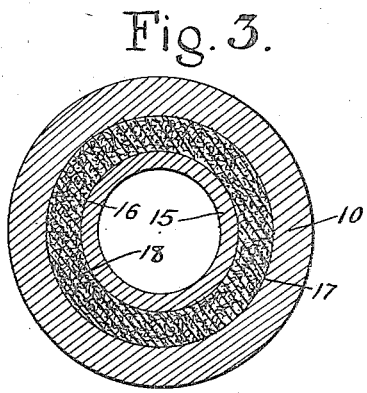
Witness
B. Siegnoff
Inventor
WILLIAM G. WILSON
By Victor J. Evans
Attorney

UNITED STATES PATENT OFFICE.

WILLIAM G. WILSON, OF WEST BRIGHTON, NEW YORK.

HOSE-COUPLING.

1,264,736.  Specification of Letters Patent.  Patented Apr. 30, 1918.

Application filed September 11, 1917. Serial No. 190,830.

*To all whom it may concern:*

Be it known that I, WILLIAM G. WILSON, a citizen of United States of America, residing at West Brighton, Staten Island, in the county of Richmond and State of New York, have invented new and useful Improvements in Hose-Couplings, of which the following is a specification.

This invention relates to hose couplings and has for its principal object the provision of a coupling having a swiveled portion which allows for free turning movements of the sections of the hose thus obviating twisting and kinking of the same with the resulting objectional features.

Another object of the invention is the provision of a novel form of packing which positively seals the joint against leakage at the swivel portion of the coupling and prevents leakage at this point.

Another object of the invention is the provision of a hose coupling having a packing made from a material which serves as a lubricant for the swivel to prevent rusting of the joint.

Another object of the invention is the provision of a hose coupling which is so constructed as to entirely eliminate any projecting portions on the same, thus presenting a smooth and even surface throughout the length of the coupling and allowing the same to be readily moved over stairways and through windows without allowing the same to catch on these objects.

A still further object of the invention is the provision of an article of the class described which is simple in construction, inexpensive to manufacture and thoroughly reliable and efficient for the purpose for which it is intended.

With these and other objects in view the invention resides in the novel construction, combination and arrangement of parts fully described in the following description and particularly pointed out in the appended claim.

In the drawings:

Figure 1, is a vertical longitudinal section through the coupling.

Fig. 2, is a plan view thereof.

Fig. 3, is a transverse sectional view through the coupling taken on the line A—A, of Fig. 1.

Fig. 4, is a detail perspective view of the packing ring.

Referring to the drawings by numerals, 10 and 11 designate respectively the mating members of the coupling, the member 11, being adapted to be threadedly engaged with the member 10, for the securing of the hose sections together. The member 10, is provided with a gasket 12, and each of the members is provided with the usual hose receiving portions 13 and 14. The hose receiving portion of the member 10, is swiveled thereto by means of a head 15, which is extended into the member 10, and upset to prevent its removal as will be readily seen in Fig. 1, of the drawing. The head 15, is provided with a channel 16, which is partly defined by a flange $16^a$ and the member 10, is provided with a V shaped channel 17 which is formed on a flange $17^a$ on said member 10, between which is interposed a packing ring 18, which is preferably V shaped on its outer periphery to co-act with the V shaped groove 17, in the member 10. The flange $16^a$ which partly defines the groove 16, is preferably up set angularly in the presence of said flange $17^a$, so that the head 15, and the section 10, are operatively held together. Spanner sockets 19, are provided centrally of the member 10, for the reception of a spanner wrench in order to designate the sections of the coupling. The packing 17, is preferably composed of graphite or some other similar lubricating material in order to prevent rusting of the swivel portion and to assure a smooth and free movement of the same. The pressure of the water through the coupling will force the angular faces of the packing securely against the V shaped groove 17, for sealing of the joint due to the slight space between the member 13, and the member 10. It will be readily understood that due to the fact that the member 13, is swiveled to the member 10, the hose sections will be allowed to turn independently of each other thus obviating twisting or kinking of the same.

While I have shown and described a simple and preferred form of my invention, I, however, wish it understood that such alterations and modifications as fall within the scope of the appended claim may be resorted to when desired.

What I claim is:—

A hose coupling comprising, a member provided at one end with an annular grooved portion, a swiveled section associated with said member and provided with a head up set toward the said grooved portion, said section having a channel therein registering with the channel of the member, an annular packing ring embracing said section at one side of said up struck portion, and received respectively in both channels and a second section operatively connected with the opposite end of said member.

In testimony whereof I affix my signature.

WILLIAM G. WILSON.